(12) United States Patent
Pashchenko et al.

(10) Patent No.: US 11,555,802 B2
(45) Date of Patent: Jan. 17, 2023

(54) INTERROGATABLE PASSIVE ACOUSTIC SENSOR DEVICE WITH REFLECTIVE TAGS

(71) Applicant: General Electric Technology GmbH, Baden (CH)

(72) Inventors: Vladimir Pashchenko, Lausanne (CH); Paul Muralt, Lausanne (CH); Hanspeter Zinn, Baden (CH)

(73) Assignee: General Electric Technology GmbH, Baden (CH)

( * ) Notice: Subject to any disclaimer, the term of this patent is extended or adjusted under 35 U.S.C. 154(b) by 392 days.

(21) Appl. No.: 16/845,335

(22) Filed: Apr. 10, 2020

(65) Prior Publication Data
US 2020/0326313 A1    Oct. 15, 2020

(30) Foreign Application Priority Data

Apr. 12, 2019   (EP) ..................................... 19169124

(51) Int. Cl.
*G01N 29/24* (2006.01)
*G01K 11/26* (2006.01)
*G01L 1/16* (2006.01)

(52) U.S. Cl.
CPC ..... *G01N 29/2437* (2013.01); *G01N 29/2462* (2013.01); *G01K 11/265* (2013.01); *G01L 1/165* (2013.01); *G01N 2291/101* (2013.01)

(58) Field of Classification Search
CPC .................. G01K 11/265; G01L 1/165; G01N 2291/101; G01N 29/2437; G01N 29/2462; H03H 9/25
See application file for complete search history.

(56) References Cited

U.S. PATENT DOCUMENTS

| | | |
|---|---|---|
| 3,946,256 A | 3/1976 | Day et al. |
| 4,144,507 A | 3/1979 | Shreve |
| 6,285,866 B1 * | 9/2001 | Lee .......................... H04B 1/28 |
| | | 29/25.35 |
| 7,243,547 B2 | 7/2007 | Cobianu et al. |
| 7,434,989 B2 | 10/2008 | Solie |

(Continued)

FOREIGN PATENT DOCUMENTS

| | | |
|---|---|---|
| EP | 1577667 A2 | 9/2005 |
| EP | 2685406 A1 | 1/2014 |
| WO | 2013004962 A1 | 1/2013 |

OTHER PUBLICATIONS

Plessky, Surface Acoustic Wave RFID Tags, Development and Implementation of RFID Technology (Year: 2009).*

(Continued)

*Primary Examiner* — David L Singer
(74) *Attorney, Agent, or Firm* — James Pemrick; Charlotte Wilson; Hoffman Warnick LLC

(57) ABSTRACT

A sensor device (1) comprises a piezoelectric transducer (3) and a base member (2). The piezoelectric transducer includes a piezoelectric member with at least one excitation electrode (37, 38) connected to a first face thereof and having a thickness (h) between the first face and a second face. The piezoelectric transducer (3) is attached to a supporting face of the base member (2) with the second face of the piezoelectric transducer positioned adjacent the supporting face of the base member. The base member includes at least one acoustic wave reflecting tag (21) distant from the piezoelectric member.

15 Claims, 3 Drawing Sheets

(56) References Cited

U.S. PATENT DOCUMENTS

| | | |
|---|---|---|
| 7,795,779 B2 | 9/2010 | Kalinin |
| 8,742,645 B2 | 6/2014 | Lee et al. |
| 9,027,407 B2 | 5/2015 | Chommeloux et al. |
| 2002/0005677 A1* | 1/2002 | Reindl .................. H03H 9/6406 |
| | | 310/313 R |
| 2015/0013461 A1 | 1/2015 | Pollard et al. |
| 2015/0117157 A1* | 4/2015 | Li ........................... G01K 1/00 |
| | | 367/189 |
| 2015/0244344 A1 | 8/2015 | Mitchell et al. |
| 2016/0012265 A1 | 1/2016 | Struble et al. |
| 2019/0190492 A1* | 6/2019 | Ram .................. H03H 9/02535 |

OTHER PUBLICATIONS

European Search Report for corresponding EP Application No. 19169124.5, dated Oct. 23, 2019, 5 pages.

\* cited by examiner

INTERROGATABLE PASSIVE ACOUSTIC SENSOR DEVICE WITH REFLECTIVE TAGS

CROSS-REFERENCE TO RELATED APPLICATIONS

This application claims the benefit of European Patent Application No. EP 19169124.5 filed Apr. 12, 2019, the disclosure of which is herein incorporated by reference in its entirety.

TECHNICAL FIELD

The present disclosure relates to a sensor device as set forth in the claims. It further relates to a measurement system incorporating said sensor device.

BACKGROUND OF THE DISCLOSURE

It is known in the art to apply piezoelectric transducers for sensing a variety of physical parameters. These applications make use, for instance, of the variability of the propagation speed of surface acoustic waves, also referred to as SAW, with mechanic stress, or deformation, respectively, strain, temperature or molecular deposits on the surface of a SAW device. The change in propagation speed, but also changes of geometry due to strain, may be detected as changes, for instance, in the travel time of a wave, phase shift, and so forth. Accordingly, SAW devices may be used, for instance, to measure temperature, strain, torque, force etc. If specific coatings are appropriately applied on a SAW device it may be applied to measure for instance airborne substances, humidity, biological matter, radiation or magnetism. Piezoelectric sensors of the mentioned type may be used as wireless sensors, without the requirement of needing a specific power source installed at or wired to the piezoelectric transducer.

Surface and bulk acoustic wave devices are also applied as bandpass filters in electronic applications, in particular in telecommunication applications.

Generally, surface acoustic wave devices are provided as electrodes on a piezoelectric substrate. Frequently, they are provided as interdigital transducers, with sets of electrodes alternatingly interlaced on the surface of a piezoelectric substrate. An interdigital transducer (IDT) is a device that consists of two interlocking comb-shaped arrays of metallic electrodes, in the fashion of a zipper. These metallic electrodes are deposited on the surface of a piezoelectric substrate to form a periodic structure. The primary function of an interdigital transducer is to convert electric signals to surface acoustic waves, SAW, by generating periodically distributed mechanical forces via piezoelectric effect in an input transducer. The same principle is applied to the conversion of SAW back to electric signals in an output transducer. Thus, certain devices apply an input transducer and an output transducer. An oscillating voltage excitation signal supplied to the input transducer causes propagating waves in the substrate which in turn are converted into an oscillating voltage response signal at the output transducer.

Surface acoustic wave sensors are suggested for instance in EP 1 577 667, U.S. Pat. Nos. 7,243,547, 7,434,989, 7,795,779, 8,742,645, 9,027,407, US 2016/0012265 and US 2015/0013461. An issue common to these devices in certain applications is that they are limited to an upper temperature boundary. US 2015/0244344 suggests a SAW device with piezoelectric materials such as ordered langasite $A_3BC_3D_2O_{14}$ structure, which can function at temperatures of up to about 1500° C. Some compositions include $Sr_3TaGa_3Si_2O_{14}$, $Sr_3NbGa_3Si_2O_{14}$, $Ca_3TaGa_3Si_2O_{14}$ and $Ca_3TaAl_3Si_2O_{14}$. Langasites, however, exhibit a relatively poor electromechanical coupling value. In the application on turbo engine blades, US 2015/0244344 suggests to place a dielectric layer between the piezoelectric material and the thermal barrier coating of the blade. US 2015/0244344 proposes to place discrete piezoelectric transducers onto an acoustic substrate so as to conceive a surface-guided bulk wave transducer. A piezoelectric transducer yielding specific advantages, in particular as to the electromechanical coupling, that is, the conversion of an electric excitation signal into acoustic waves, has been disclosed by V. Pashchenko, R. Matloub, F. Parsapourkolour, P. Muralt, S. Balandras and K. Haffner at the 2016 IEEE International Ultrasonics Symposium.

OUTLINE OF THE SUBJECT MATTER OF THE PRESENT DISCLOSURE

The present disclosure relates to a sensor device as initially mentioned. In one aspect a sensor shall be provided which enables reliable temperature measurements. In another aspect, a sensor shall be provided which is suitable for use under high temperature conditions, for instance at temperatures above 300° C., above 450° C., or even above 600° C. The sensor device shall in other aspects be a passive sensor device which does not require a specific power source directly connected to the sensor device. In a further aspect the sensor device shall be capable of remote operation so that there is no requirement for cable connection to further hardware.

This is achieved by the subject matter set forth in the claims.

Further effects and advantages of the disclosed subject matter, whether explicitly mentioned or not, will become apparent in view of the disclosure provided below.

Accordingly, disclosed is a sensor device comprising a piezoelectric transducer and a base member, wherein the piezoelectric transducer comprises a piezoelectric member with at least one excitation electrode connected to a first face thereof. In particular, the base member is a non-piezoelectric base member, i.e., the base member is made from a non-piezoelectric material. As outlined in more detail below, the base member may, in non-limiting particular embodiments, be a pure sapphire member. The excitation electrode is suited to electrically excite the piezoelectric member by an externally supplied voltage as well as to receive and transfer a voltage signal caused by mechanic excitation of the piezoelectric member. The piezoelectric member has a thickness defined between the first face and a second face. The piezoelectric transducer is attached to a supporting face of the base member with the second face of the piezoelectric transducer adjacent the supporting face of the base member. The base member comprises at least one acoustic wave reflecting tag distant from the piezo electric piezoelectric member. In operation, substantially, the piezoelectric member is electrically excited in supplying an oscillating voltage to the at least one excitation electrode. Said electric excitation signal has a limited duration. The vibration of the piezoelectric member is transferred to the base member and propagates as a surface acoustic wave on the surface of the base member. The surface acoustic wave is reflected at the at least one acoustic wave reflecting tag. The reflected surface acoustic wave is transferred to the piezoelectric member and mechanically excites the piezoelectric member. Due to the excitation of the piezoelectric member an oscillating voltage is generated at the excitation electrode. In this respect the piezoelectric transducer, that is, one and the same piezoelectric transducer, is configured to work as an input transducer and an output transducer. "One and the same piezoelectric transducer" does not necessarily mean that only one single transducer is provided; however, this is one embodiment, as outlined below. It states that one transducer exhibits both functionalities. It is understood that the duration of the electric excitation signal must be shorter than the expected delay between the acoustic wave excitation and the return of the response signal to the transducer. Thus, the sensor device may, as stated above, in exemplary embodiments comprise one single transducer, and this single transducer may be used as input transducer and as output transducer. The delay time between electrically exciting the piezoelectric member and detecting the response signal from the reflected wave may be dependent upon certain physical parameters, such as, while not limited to, temperature or strain. The sensor device may be calibrated so as to know the correlation between the delay time and the physical parameter of interest. Hence, the herein disclosed sensor device may be used to determine or measure the physical parameter of interest. It may thus for instance be used to measure temperatures. Accordingly, the sensor may be interrogated in applying an oscillating excitation voltage signal to the transducer so as to electrically excite the piezoelectric member and accordingly surface acoustic waves on the base member. A response signal from the surface acoustic waves reflected from the acoustic wave reflecting tags subsequently mechanically excites the piezoelectric member, thus generating an electric signal at the excitation electrode, which is detectable as a response signal. It is understood that in particular the excitation signal may be wirelessly transferred to the excitation electrode as well as the response signal may be wirelessly transmitted from the excitation electrode.

In instances, the total thickness of the piezoelectric member as measured from the first face to the second face might correspond to at least approximately ½ of the wavelength of the bulk acoustic waves inside the piezoelectric member at a target excitation frequency. It is thus understood that the sensor device may be specifically designed for use at a specific target excitation frequency or target frequency.

It is noted that within the framework of the present disclosure the use of the indefinite article "a" or "an" does in no way stipulate a singularity nor does it exclude the presence of a multitude of the named member or feature. It is thus to be read in the sense of "at least one" or "one or a multitude of".

In exemplary embodiments of the sensor device the at least one acoustic wave reflecting tag is provided on the supporting face of the base member. This may be found beneficial in various aspects. On the one hand, as the acoustic waves from the transducers are transferred to the base member from the transducer at the supporting face of the base member it is more than reasonable to assume that the surface acoustic wave is the most intense on the supporting face. Moreover, generally the sensor device may be intended to be attached to a component surface with a face of the base member opposite the supporting face such that surface acoustic wave propagation on said opposite face may be inhibited or strongly attenuated.

In other aspects, the at least one acoustic wave reflecting tag may be a groove in the supporting face of the base member and is provided at a delay line width from the piezoelectric transducer. A groove may be easily manufactured in any kind of base member, and will prove robust in harsh environments such as being exposed to high temperatures, high pressure and/or aggressive species. Further, it has been shown that grooves yield an excellent surface acoustic wave reflection quality. The delay line, as herein used, denotes the space on the support face of the base member between the transducer and an acoustic wave reflecting tag, and the width of the delay line is, as will be readily appreciated, decisive for the magnitude of the time delay between the electric excitation of the transducer and the detection of the response signal.

In embodiments, the depth of the grooves corresponds to 3% or more and 7% or less of the wavelength of the surface acoustic waves on the base member at the envisaged excitation frequency, and in more specific embodiments to at least approximately 5% of said wavelength. It was found that the depth of the grooves has significant influence on the quality of the response signal, as a groove which is too shallow will yield an insufficient reflection amplitude. On the other hand, it was observed that too deep grooves result in transformation of surface acoustic waves into bulk acoustic waves and to parasitic dissipation. The beneficial depth range might depend on the material of the base member. The above-mentioned values result in good performance if, for instance, the base member is a sapphire base member. The width of the grooves in the direction of wave propagation may in instances correspond at least approximately to ¼ of the wavelength of the surface acoustic waves on the base member at the target excitation frequency.

In embodiments of the herein disclosed sensor device the piezoelectric transducer comprises at least one longitudinally extending beam and the at least one acoustic wave reflecting tag extends parallel to the beam of the piezoelectric transducer. More specifically, the wave reflecting tag is parallel offset from the beam with the offset direction being perpendicular to the beam and the tag. This yields in a particularly well reflection of the generated surface acoustic wave from the tag and a likewise good reception of the reflected surface acoustic wave signal by the transducer. It may further be the case that a length of the tag equals at least the length of the beam, such a wave laterally propagating from the beam is entirely seized by the tag. It may be found beneficial, by virtue of the fact that the base member has an acoustic impedance and the piezoelectric member has an acoustic impedance, if the base member and the piezoelectric transducer are provided such that the a ratio between the acoustic impedance of piezoelectric member divided by the acoustic impedance of the base member equals at least approximately $2^{-1/2}$. This may improve the acoustic coupling between the transducer and the base member such that, upon a certain acoustic power input from the transducer, the surface acoustic wave amplitude on the base member is enhanced.

In order to enable wireless signal and power transmission to the sensor device as well as wireless signal transmission from the sensor device the excitation electrode may be connected to an antenna. The antenna, in turn, may be provided on the supporting face of the base member, which yields a particularly compact and robust design. It is understood that effective wireless power and signal transmission to and from the transducer is the easier to achieve the lower the power demand for generating a certain acoustic wave amplitude inside the piezoelectric member is, or, vice versa, the higher an acoustic wave magnitude is for a given excitation signal strength. Moreover, the higher the efficiency of mechanical wave transmission and conversion between the transducer and the base member is, the stronger will the response signal be which results from a given excitation signal, which further supports effective wireless signal transfer between the sensor device and any evaluation unit and an acceptable signal-to-noise ratio.

Further, it has been found to improve, at least in embodiments, the sensor device performance if a ground electrode is connected to the second face of the transducer, that is, in particular, adjacent the base member or between the second face of the piezoelectric member and the supporting surface of the base member. In said case the thickness of the piezoelectric member is be measured between the first face and the face facing the ground electrode. It was found that this arrangement yields a particular performance benefit is an aluminum scandium nitrate transducer is applied. In certain, non-limiting embodiments the ground electrode is a platinum electrode.

In more specific embodiments the piezoelectric transducer comprises a one-piece monolithic piezoelectric member, wherein an array of parallel grooves having a depth are provided within the piezoelectric member and extending in the first face, whereby an array of parallel extending beams are defined in the piezoelectric member and separated from each other by the grooves. The depth of the grooves is smaller than the total thickness of the piezoelectric member as measured between the first face and a second face of the piezoelectric member, so as to maintain mechanical coupling between the beams. On the first face of the piezoelectric member each beam is connected to an excitation electrode. It was shown by V. Pashchenko, R. Matloub, F. Parsapourkolour, P. Muralt, S. Balandras and K. Haffner at the 2016 IEEE International Ultrasonics Symposium that the coupling factor, that is, essentially the efficiency with which the acoustic waves from the transducer are converted into surface acoustic waves on the base member, and, as the skilled person will readily appreciate, vice versa the reflected surface acoustic waves are transferred to the transducer for being converted into an electric response signal, is significantly enhanced when a mechanical coupling between the transducer beams is maintained. Due to these effects the response of the sensor device to an excitation signal provided to the transducer is enhanced. The response signal strength upon interrogation of the sensor is thus improved. Hence, the signal-to-noise ratio upon wireless transfer of the excitation signal to the transducer and the response signal from the transducer is enhanced.

In embodiment, a pitch of the beams measured perpendicular to their longitudinal extends corresponds at least approximately to one half of the wavelength of the surface acoustic waves on the base member at the target excitation frequency. The depth of the grooves which separate the beams from each other may in embodiments correspond to at least approximately 60% of the total thickness of the piezoelectric member as measured between the first face and a second face of the piezoelectric member. As noted above, said total thickness of the piezoelectric member as measured from the first face to the second face might correspond to at least approximately ½ of the wavelength of the bulk acoustic waves inside the piezoelectric member at the target excitation frequency. Each of said values is observed to improve the electromechanical coupling for surface acoustic waves, that is, the surface acoustic wave intensity or amplitude per electric excitation signal amplitude, and, vice versa, the electric signal strength derived from a certain reflected wave amplitude. The enhancement of said parameter may serve to enhance the signal-to-noise ratio for the sensor device.

In more particular embodiments the array of beams is subdivided into two subsets, wherein the excitation electrodes connected to a first subset of beams have electric connection with each other, the excitation electrodes connected to a second subset of beams have electric connection with each other and are electrically insulated from the excitation electrodes connected to the first subset of beams, wherein the beams of the first subset are arranged alternatingly with the beams of the second subset such that the two subsets of beams are interlaced with each other. This embodiment essentially constitutes an interdigital transducer. It may moreover be the case that the first subset of beams extend from a first transverse beam and towards a second transverse beam and the second subset of beams extend from the second transverse beam and towards the first transverse beam. The first subset of beams are separated from the second transverse beam, and the second subset of beams are separated from the first transverse beam, by respective transverse grooves. The transverse grooves may have the same depth as the grooves separating the beams from each other. "Transverse", in this context and in relation to the beams shall be construed as meaning transverse to the beams of the array of beams rather than transverse with respect to the sensor device or base member.

The excitation electrodes of each subset of beams may be connected to each other and may moreover be connected to a common antenna. It is understood, however, that the electrodes of the first subset of beams are electrically insulated from the electrodes of the second subset of beams.

The piezoelectric transducer may comprise at least one piezoelectric member which consists of one of aluminum nitrate and aluminum scandium nitrate. In this respect the piezoelectric transducer comprises at least one piezoelectric member consisting of aluminum nitrate or aluminum scandium nitrate. Other suitable materials known now or in the future may be applied for a piezoelectric member in the herein described piezoelectric transducer. The base member may be a pure sapphire member.

In embodiments, at least a surface of the base member between the piezoelectric transducer and at least one acoustic wave reflecting tag may be coated with a metal oxide. This enables to apply the sensor device for the detection of certain chemical species.

Further disclosed is a measurement system comprising at least one sensor device of the type outlined above. The at least one excitation electrode is adapted and configured for contactless transmission of a signal. The measurement system further comprises equipment configured for transmitting an actuation signal to the transducer and receiving a response signal from the transducer, that is, to interrogate the sensor. The equipment for transmitting an actuation signal to the transducer and receiving a response signal from the transducer may be a single device or may be provided as separate devices.

Further disclosed is a method for manufacturing a sensor device of the herein disclosed type. The method comprises providing a base member, or a substrate, respectively. The base member, in specific embodiments, is a sapphire member. The method comprises etching grooves, intended to serve as acoustic wave reflecting tags, into a top surface of the base member. The method comprises depositing a piezoelectric material on the top surface of the base member. Depositing the piezoelectric material may comprise sputtering. The piezoelectric material may be one of aluminum nitrate or aluminum scandium nitrate.

Subsequently, the method comprises etching the piezoelectric material so as to generate the grooves in the piezoelectric material which separate the transducer beams from each other. It is understood, that the etching depth when generating the grooves is smaller than the thickness of the piezoelectric layer. The method may further comprise masking the section of the piezoelectric material which is intended to form the transducer and remove the piezoelectric material from parts of the base member which are not intended to be covered by the transducer. The method may, in embodiments, comprise providing a layer of electrode material on the layer of piezoelectric material before etching the grooves, or beams, respectively. Thus, the excitation electrodes are formed on the beams when the separating grooves are etched. A more specific embodiment may further comprise depositing a material for the ground electrode on the base member and manufacturing the ground electrode before depositing the piezoelectric material.

It is understood that the features and embodiments disclosed above may be combined with each other. It will further be appreciated that further embodiments are conceivable within the scope of the present disclosure and the claimed subject matter which are obvious and apparent to the skilled person.

BRIEF DESCRIPTION OF THE DRAWINGS

The subject matter of the present disclosure is now to be explained in more detail by means of selected exemplary embodiments shown in the accompanying drawings. The figures show FIG. 1 a plan view on an exemplary embodiment of a sensor device of the herein described type.

It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

EXEMPLARY MODES OF CARRYING OUT THE TEACHING OF THE PRESENT DISCLOSURE

Figure 1:
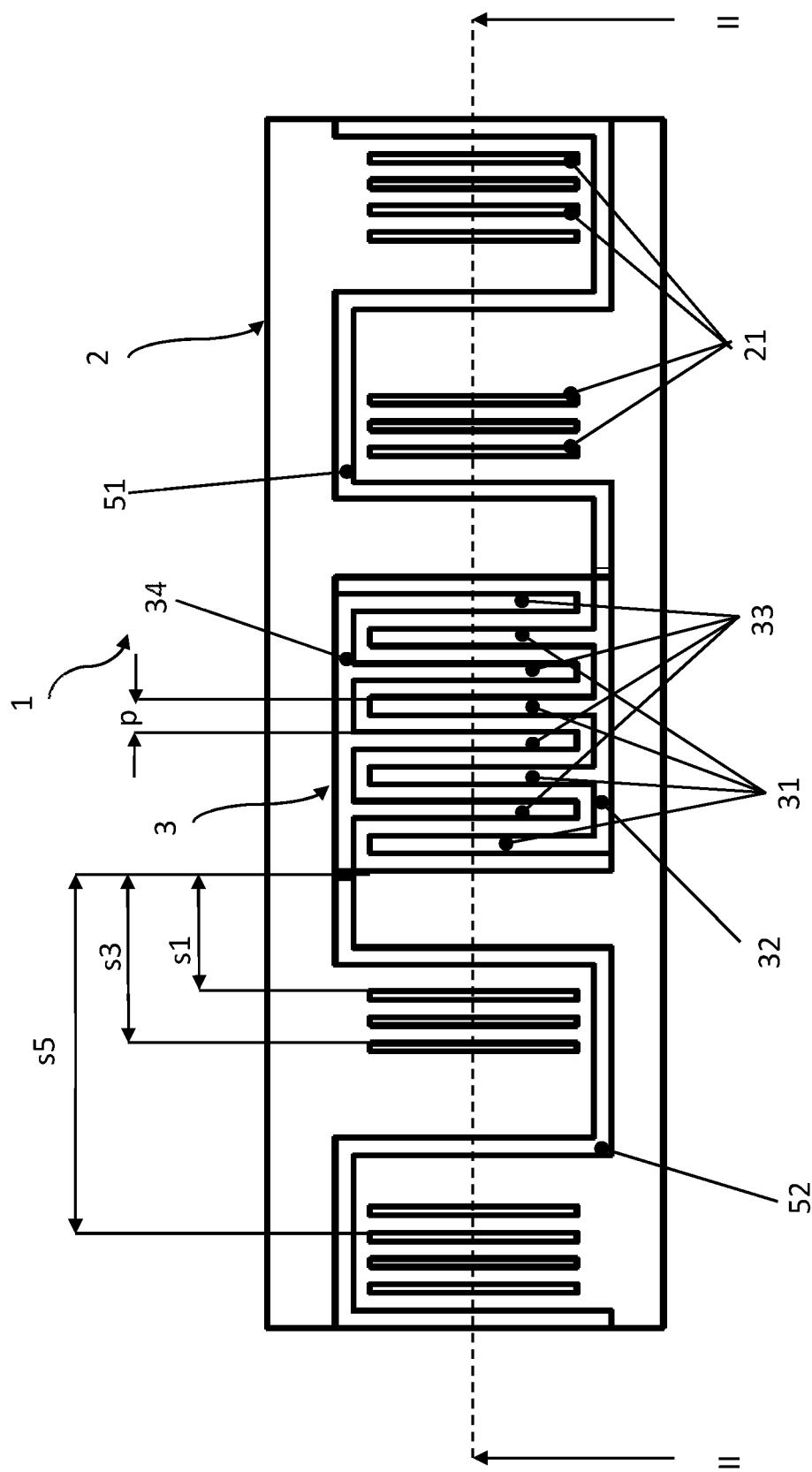
Figure 2:
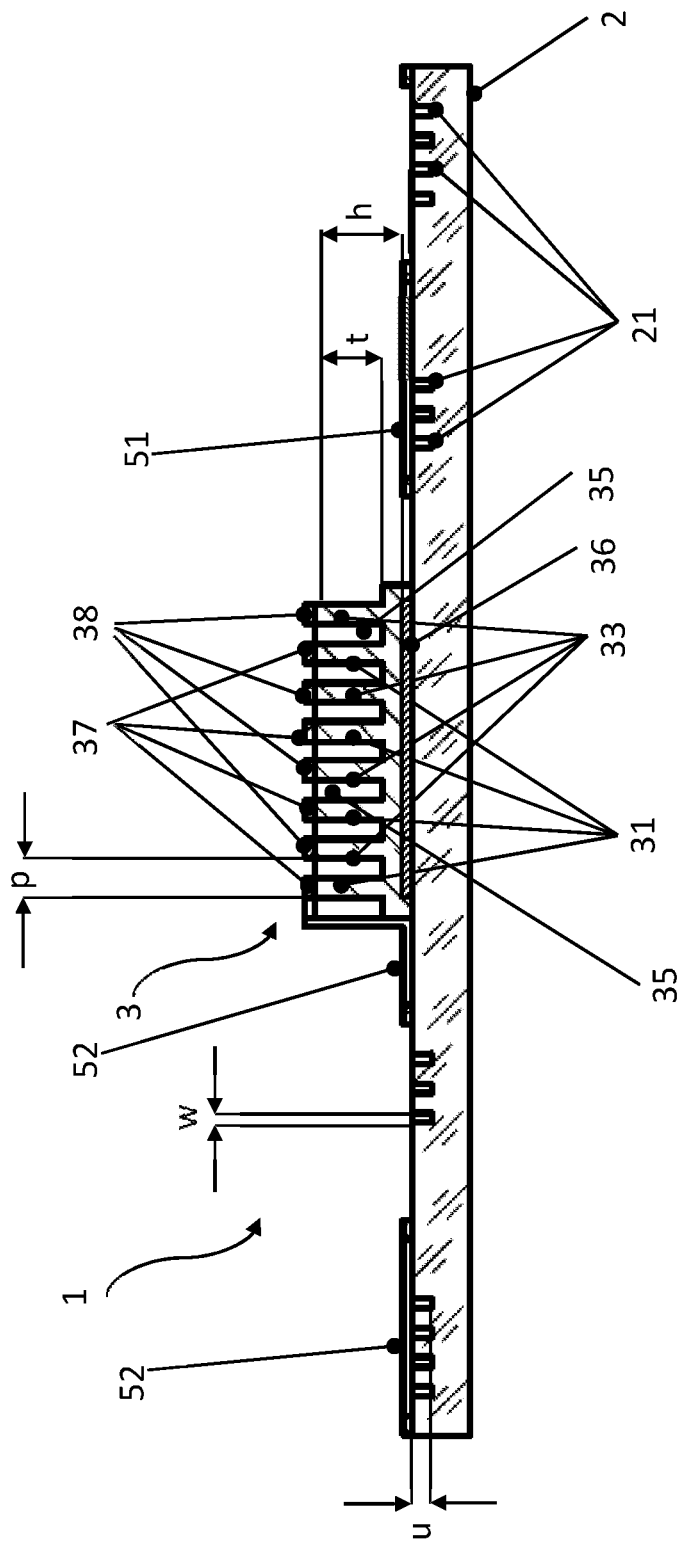
FIG. 2 a sectional view of the sensor device shown in FIG. 1.

The above-described subject matter will be better appreciated by virtue of a non-limiting exemplary embodiment depicted in FIGS. 1 and 2. FIG. 1 shows a plan view onto an exemplary embodiment of a sensor device 1 of the kind described above. FIG. 2 shows a sectional view along line II-II in FIG. 1. A piezoelectric transducer 3 is provided on a base member, or substrate, 2. The piezoelectric transducer is attached to the base member with a bottom or second face of a piezoelectric member adjacent a support surface of base member 2. The base member may be made from sapphire. The piezoelectric transducer typically comprises the piezoelectric member and electrodes provided on a top or first face of the piezoelectric member. It is noted that in this respect the terms like "top" and "bottom", "on", "below", "under" and the like shall not be construed as limiting the subject matter to a specific orientation in space but shall rather be understood as facilitating explanations as to the drawings. The piezoelectric member may in embodiments be made from an aluminum nitrate AlN or aluminum scandium nitrate AlScN material. The piezoelectric member comprises parallel extending beams which are provided in two subsets, 31 and 33. As is best seen from FIG. 2, the beams are separated by grooves 35, only a part of which is denoted with reference numbers for the sake of clarity and comprehensibility of the drawing. As is best seen in FIG. 1, all beams 31 of the first subset are connected to a first transverse beam 32. All beams 33 of the second subset are connected to a second transverse beam 34. The beams 31 of the first subset of beams are separated from the second transverse beam 34 by grooves. The beams 33 of the second subset of beams are separated from the first transverse beam 32 by grooves. The grooves separating the beams from the transverse beams are connected to the grooves 35 separating the beams from each other, and may in particular embodiments have the same depth than the grooves 35 separating the beams from each other. As is also best visible from FIG. 1, the beams of the first and second subset, 31 and 33, respectively, are alternatingly arranged. As will be appreciated by virtue of FIG. 2, all beams are connected to each other adjacent the second, in this case bottom, face of the piezoelectric member adjacent the base member. The depth t of the grooves extending from a first or top face of the piezoelectric member is smaller than the thickness h of the piezoelectric member.

As noted above, it was found beneficial if the ratio of the groove depth t and the piezoelectric member thickness h is 0.6, or equals at least approximately 0.6. A first subset of excitation electrodes 37 are connected to a top face of the piezoelectric member and provided on top of the beams 31 of the first subset of beams. A second subset of excitation electrodes 38 are connected to a top face of the piezoelectric member and provided on top of the beams 33 of the second subset. All excitation electrodes 37 of the first subset are electrically connected to each other, for instance along the top side of first transverse beam 32. All excitation electrodes 38 of the second subset are electrically connected to each other, for instance along the top side of the second transverse beam 34. The excitation electrodes 37 of the first subset and 38 of the second subset are electrically insulated from each other. In that all electrodes which are arranged on the first subset of beams are connected to each other and all electrodes which are arranged on the second subset of beams are connected to each other, and the beams of the first and second subset are arranged alternatingly, and interdigital transducer is formed. Antennas 51 and 52 are provided on a top face of the base member 2. Antenna 51 is electrically connected to the excitation electrodes 37 located on the first subset of beams. Antenna 52 is electrically connected to the excitation electrodes 38 located on the second subset of beams. Further, a ground electrode 36 is provided adjacent a bottom face of the piezoelectric member. The ground electrode may be a platinum electrode. Also, in embodiments, the excitation electrodes and antennas may comprise platinum. Antennas 51 and 52 may be configured to receive excitation signals and transmit a high-frequency excitation voltage signal to excitation electrodes 37 and 38. The excitation voltage induces oscillations inside the piezoelectric member. The oscillations may result in the formation of bulk acoustic waves inside the piezoelectric member. Vice versa, a mechanic excitation of the piezoelectric member results in a voltage which is detectable at the excitation electrodes and may be transmitted to remote equipment by the antennas 51 and 52. A bulk acoustic wave which is induced inside the piezoelectric member may be transferred to the base member and may be converted into a surface acoustic wave propagating along the top surface of the base member, that is, the support surface at which the transducer is attached to the base member. The skilled person will appreciate that the device is intended to be operated at a target excitation frequency. Thus, a wavelength of the bulk acoustic waves inside the piezoelectric member and of the surface acoustic waves on the surface of the base member at said target frequency are known. A spatial frequency of the beams of the piezoelectric transducer is chosen such that a pitch p of the beams corresponds, at least approximately, to ½ wavelength of the surface acoustic waves on the base member at the target frequency. As a result, if the beams of the first and second subset are excited so as to oscillate in a counter-phase relationship, the individual beams will oscillate in resonance with the surface acoustic wave on the surface of the base member. A minimum thickness of the sapphire base member should advantageously correspond to at least ten times said wavelength. As becomes apparent in view of FIG. 1, the base member has a longitudinal extent and a transverse extent, wherein the longitudinal extend is larger than the transverse extent. The beams 31, 33 of the array of beams of transducer 3 extend with their longitudinal orientation in the transverse direction of the base member and are alternatingly arranged along the longitudinal direction of the base member. It is noted that the transverse beams 32, 34 extend in the longitudinal direction of the base member. Thus, when the transducer is excited with an electric signal at the target frequency, a surface acoustic wave on the base member propagates from the transducer perpendicular to the beams 31, 33 of the array of beams and in the longitudinal direction of the base member, and towards the longitudinal ends of the base member. Grooves 21 extend in the transverse direction of the base member, or parallel to the beams of the transducer, or, in other words, transverse to the propagation direction of the surface acoustic waves. Said grooves 21 are provided in the support surface or top surface of the base member. Only some of the grooves are specifically identified by a reference number. Said grooves constitute acoustic wave reflecting tags. The grooves are arranged at a delay line with s from the transducer. The delay line widths of some of the grooves are identified at s1, s3 and s5. It is understood that the arrangement of acoustic wave reflecting grooves on both sides of the transducer is symmetric. Accordingly, the time between the excitation of an acoustic wave by the transducer and the detection of a response signal as a reflected wave from a groove is twice the respective delay line width divided by the propagation speed of the surface acoustic wave. In order to achieve a high reflection quality, the depth u of an acoustic wave reflecting groove is preferably chosen within a range from 1% or more to 6% or less of the surface acoustic wave wavelength at the target frequency. In more specific embodiments the minimum depth corresponds to 2% of the surface acoustic wave wavelength at the target frequency. In still further more specific embodiments the maximum depth corresponds to 5% of the surface acoustic wave wavelength at the target frequency. A smaller depth of the grooves will yield less reflection, while an excessive depth of the grooves will yield parasitic dissipation and conversion of surface acoustic waves into bulk acoustic waves. It will further be appreciated that, in embodiments, the lengths of the grooves, extending in the transverse direction of the base member, correspond to at least the length of the beams of the transducer in the transverse direction of the base member. Said lengths of the grooves may further correspond to at least the extent of the transducer in the transverse direction of the base member. The grooves may be, and in the exemplary embodiment are, arranged parallel offset from the beams of the transducer. In order to avoid destructive interference of reflected waves and/or blurred reflection signals, the width w of the grooves may advantageously be chosen to correspond, at least approximately, to ¼ of the surface acoustic wave wavelength at the target frequency, while the difference between the delay line widths of different grooves on either side of the transducer—for instance the difference s5-s3, s5-s1 or s3-s1—should, at least approximately, correspond to an integer multiple of one half wavelength of the surface acoustic wave at the target frequency.

In operation, measurement values from the sensor device may be interrogated in broadcasting a high-frequency excitation signal of a short duration to the transducer. The "short duration" should beneficially be shorter than the delay time expected for the return of a reflected wave signal from the closest acoustic wave reflecting groove to the transducer. The excitation signal may be a wirelessly transmitted high-frequency signal, for instance in a range from some 100 MHz to some GHz. The frequency of the excitation signal corresponds in particular to a target frequency for which the sensor device is designed, in particular with respect to specific dimensions as outlined above or, in another aspect, that dimensions of the sensor device are designed to suit the target frequency. The wirelessly broadcasted signal is received by the antennas and transmitted to the excitation electrodes. As will be appreciated by virtue of FIGS. 1 and 2, the dipoles of the antennas extend essentially parallel to each other. However, the subsets of excitation electrodes are connected to opposite ends of the dipoles, and thus the oscillating voltage signals present at the two subsets of excitation electrodes have a 180° or counterphase shift to each other. The oscillating voltage signals electrically excite bulk acoustic waves inside the piezoelectric member of the transducer. The bulk acoustic waves are converted into surface acoustic waves which propagate on the surface of the base member. After having propagated over the delay line, a reflection of the surface acoustic wave propagates as a response wave back towards the transducer. The response wave mechanically excites the piezoelectric member, and thus an electric response signal is generated at the excitation electrodes. The electric response signal is, by the antennas, wirelessly transmitted to a receiver. The delay time between broadcasting the excitation signal and receiving the response signal is, as initially outlined, dependent on certain physical parameters. The sensor device may accordingly be calibrated so that a physical parameter, like, for instance, while not limited to, temperature or strain, may be deducted from the delay time.

Figure 3:
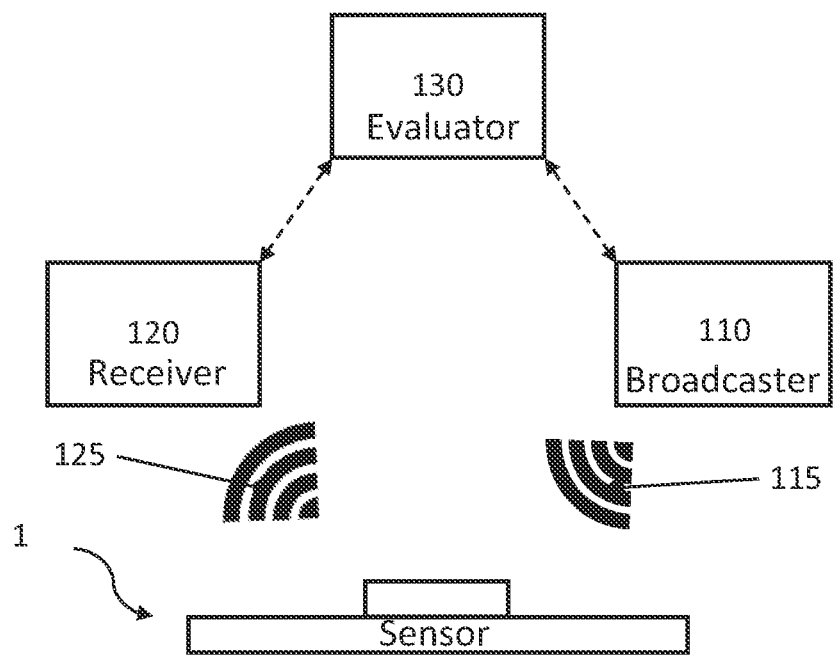
FIG. 3 an exemplary embodiment of a measurement system including a sensor device of the herein described type.

FIG. 3 schematically depicts an exemplary embodiment of a measurement system comprising a sensor device of the above-described type. Sensor device 1 may for instance be located in a hot gas path of a gas turbine engine. A broadcasting device 110 broadcasts excitation signal 115 to sensor device 1. Considerations with respect to the frequency and duration of the excitation signal are outlined above. With the above-mentioned delay, which may allow to draw conclusions about physical conditions at the sensor device, sensor device 1 transmits a response signal 125 to a receiver device 120. Broadcasting device 110 and receiver device 120 may be connected to a common evaluation unit 130 which registers the time delay between broadcasting the excitation signal and receiving the response signal and calculates a desired physical condition from said measured time delay. In other embodiments, one or more of the broadcasting device, the receiver device and the evaluation unit may be comprised in one single device or unit.

From the description above the skilled person will readily appreciate how the sensor device may also be operated with a wired connection.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

The invention claimed is:

1. A sensor device (1) comprising a piezoelectric transducer (3) and a base member (2),
   wherein the piezoelectric transducer comprises a piezoelectric member with at least one excitation electrode (37, 38) connected to a first face thereof and having a thickness (h) between the first face and a second face,
   wherein the piezoelectric transducer (3) is attached to a supporting face of the base member (2) with the second face of the piezoelectric transducer adjacent the supporting face of the base member,
   characterized in that the base member comprises at least one acoustic wave reflecting tag (21) distant from the piezoelectric member.

2. The sensor device of claim 1, characterized in that the at least one acoustic wave reflecting tag (21) is provided on the supporting face of the base member (2).

3. The sensor device according to claim 1, characterized in that the at least one acoustic wave reflecting tag (21) is a groove in the supporting face of the base member (2) and is provided at a delay line width (s1, s3, s5) from the piezoelectric transducer (3).

4. The sensor device according to claim 1, characterized in that the piezoelectric transducer (3) comprises at least one longitudinally extending beam (31, 33) and the at least one acoustic wave reflecting tag (21) extends parallel to the beam of the piezoelectric transducer.

5. The sensor device according to claim 1 wherein the base member (2) has an acoustic impedance and the piezoelectric member has an acoustic impedance, characterized in that the base member and the piezoelectric transducer are provided such that a ratio between the acoustic impedance of piezoelectric member divided by the acoustic impedance of the base member equals at least approximately $2^{-1/2}$.

6. The sensor device according to claim 1, characterized in that the at least one excitation electrode (37, 38) is connected to an antenna (51, 52) and the antenna is provided on the supporting face of the base member.

7. The sensor device according to claim 1, characterized in that a ground electrode (36) is connected to the second face of the piezoelectric member.

8. The sensor device according to claim 1, characterized in that the piezoelectric transducer comprises a one-piece monolithic piezoelectric member, wherein an array of parallel grooves (35) having a depth (t) are provided within the piezoelectric member and extending in the first face, whereby an array of parallel extending beams (31, 33) are defined in the piezoelectric member and separated from each other by the grooves, wherein on the first face of the piezoelectric member each beam is connected to an excitation electrode (37, 38).

9. The sensor device according to claim 8, characterized in that the array of beams is subdivided into two subsets, wherein the excitation electrodes (37) connected to a first subset of beams (31) have electric connection with each other, the excitation electrodes (38) connected to a second subset of beams (33) have electric connection with each other and are electrically insulated from the excitation electrodes (37) connected to the first subset of beams (31), wherein the beams (31) of the first subset are arranged alternatingly with the beams (33) of the second subset such that the two subsets of beams are interlaced with each other.

10. The sensor device according to claim 9, characterized in that the first subset of beams (31) extend from a first transverse beam (32) and towards a second transverse beam (34) and the second subset of beams (33) extend from the second transverse beam (34) and towards the first transverse beam (32), wherein the first subset of beams (31) are separated from the second transverse beam (34), and the second subset of beams (33) are separated from the first transverse beam (32), by respective transverse grooves.

11. The sensor device according to claim 9, characterized in that the excitation electrodes (37) of the first subset of beams (31) are jointly connected to a first antenna (51) and the excitation electrodes (38) of the second subset of beams (33) are jointly connected to a second antenna (52).

12. The sensor device according to claim 1, characterized in that the piezoelectric transducer (3) comprises at least one piezoelectric member which consists of one of aluminum nitrate and aluminum scandium nitrate.

13. The sensor device according to claim 1, characterized in that the base member (2) is a pure sapphire member.

14. The sensor device according to claim 1, characterized in that at least a surface of the base member (2) between the piezoelectric transducer (3) and at least one acoustic wave reflecting tag (21) is coated with a metal oxide.

15. A measurement system comprising at least one sensor device (1) according to claim 1, wherein the at least one excitation electrode is adapted and configured for contactless transmission of a signal, and further comprising equipment (110, 120) configured for transmitting an actuation signal to the transducer and receiving a response signal from the transducer.

* * * * *